United States Patent
Ressel et al.

(10) Patent No.: US 10,611,785 B2
(45) Date of Patent: Apr. 7, 2020

(54) PROCESS FOR PRODUCING PHOSPHORUS-CONTAINING CYANOHYDRIN ESTERS

(71) Applicant: BASF SE, Ludwigshafen am Rhein (DE)

(72) Inventors: Hans-Joachim Ressel, Hattersheim (DE); Kilian Tellmann, Köln (DE); Mark James Ford, Wiesbaden-Breckenheim (DE); Martin Littmann, Leverkusen (DE); Günter Schlegel, Leverkusen (DE)

(73) Assignee: BASF SE, Ludwigshafen Am (DE)

( * ) Notice: Subject to any disclaimer, the term of this patent is extended or adjusted under 35 U.S.C. 154(b) by 0 days.

(21) Appl. No.: 15/756,509

(22) PCT Filed: Aug. 30, 2016

(86) PCT No.: PCT/EP2016/070348
§ 371 (c)(1),
(2) Date: Feb. 28, 2018

(87) PCT Pub. No.: WO2017/037033
PCT Pub. Date: Mar. 9, 2017

(65) Prior Publication Data
US 2018/0319827 A1    Nov. 8, 2018

(30) Foreign Application Priority Data
Sep. 2, 2015  (EP) .................................. 15183420

(51) Int. Cl.
*C07F 9/32*  (2006.01)

(52) U.S. Cl.
CPC .................................. *C07F 9/3211* (2013.01)

(58) Field of Classification Search
None
See application file for complete search history.

(56) References Cited

U.S. PATENT DOCUMENTS

| | | |
|---|---|---|
| 3,914,345 A | 10/1975 | Kleiner et al. |
| 4,168,963 A | 9/1979 | Rupp et al. |
| 4,474,711 A | 10/1984 | Kleiner et al. |
| 4,485,052 A | 11/1984 | Kleiner et al. |
| 4,521,348 A | 6/1985 | Finke et al. |
| 4,599,207 A | 7/1986 | Lachhein et al. |
| 4,839,105 A | 6/1989 | Kleiner |
| 5,128,495 A | 7/1992 | Scheffel et al. |
| 6,359,162 B1 | 3/2002 | Willms |

FOREIGN PATENT DOCUMENTS

| | | |
|---|---|---|
| EP | 0 011 245 A1 | 5/1980 |
| EP | 0 019 750 A1 | 12/1980 |

OTHER PUBLICATIONS

International Search Report of International Patent Application No. PCT/EP2016/070348 dated Oct. 5, 2016.

*Primary Examiner* — Samantha L Shterengarts
(74) *Attorney, Agent, or Firm* — McBee Moore & Vanik IP, LLC

(57) ABSTRACT

The present invention primarily relates to a process for producing certain phosphorus-containing cyanohydrin esters of formula (I) and the use thereof for producing glufosinate/glufosinate salts. The present invention further relates to a process for producing glufosinate/glufosinate salts.

19 Claims, No Drawings

PROCESS FOR PRODUCING PHOSPHORUS-CONTAINING CYANOHYDRIN ESTERS

CROSS-REFERENCE TO RELATED APPLICATIONS

This application is a National Stage entry of International Application No. PCT/EP2016/070348, filed 30 Aug. 2016, which claims priority to European Patent Application No. 15183420.7, filed 02 Sep. 2015.

BACKGROUND

Field

The present invention primarily relates to a process for producing certain phosphorus-containing cyanohydrin esters of hereinbelow-defined formula (I) and the use thereof for producing glufosinate/glufosinate salts. The present invention further relates to a process for producing glufosinate/glufosinate salts.

Description of Related Art

Phosphorus-containing cyanohydrin esters are valuable intermediates in various industrial fields, in particular for producing biologically active substances which can be employed in the pharmaceutical/agrochemical sector.

U.S. Pat. No. 4,168,963 describes a wide variety of phosphorus-containing herbicidally active compounds, among which in particular phosphinothricin (2-amino-4-[hydroxy(methyl)phosphinoyl]butanoic acid; common name: glufosinate, referred to hereinbelow as glufosinate) and the salts thereof have attained commercial importance in the agrochemical sector.

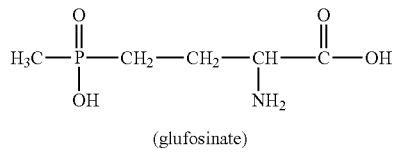

(glufosinate)

Methods for producing intermediates for the synthesis of such phosphorus-containing herbicidally active compounds, in particular of glufosinate, are described in U.S. Pat. Nos. 4,521,348, 4,599,207 and 6,359,162B 1 for example.

Reactions of cyanohydrin esters and methanephosphonous esters are described in U.S. Pat. Nos. 4,521,348 or 4,599,207 for example.

While the prior art processes for producing phosphorus-containing cyanohydrin esters allow production of the desired phosphorus-containing cyanohydrin esters, in some cases in very good yield, they do still have disadvantages such as, for example, yields of phosphorus-containing cyanohydrin esters that are still in need of improvement, an excessively high proportion of coupling products or byproducts, excessively complex purification/isolation of the phosphorus-containing cyanohydrin esters and/or reaction conditions that are excessively arduous in terms of process/plant engineering.

SUMMARY

It is accordingly an object of the present invention to find a process for producing phosphorus-containing cyanohydrin esters which provides the phosphorus-containing cyanohydrin esters in further improved yield and/or results in a lower proportion of coupling products or byproducts and in addition preferably allows for an improved reaction regime, for example in terms of aspects relevant to safety, the environment and/or quality.

The hereinbelow-described process according to the invention achieves this object.

The present invention provides a process for producing phosphorus-containing cyanohydrin esters of formula (I)

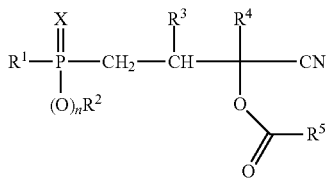

characterized in that a compound of formula (II)

is reacted with a compound of formula (III)

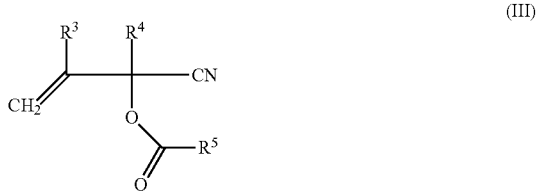

wherein in each case:
$R^1$ represents $(C_1-C_{12})$-alkyl, $(C_1-C_{12})$-haloalkyl, $(C_6-C_{10})$-aryl, $(C_6-C_{10})$-haloaryl, $(C_7-C_{10})$-aralkyl, $(C_7-C_{10})$-haloaralkyl, $(C_4-C_{10})$-cycloalkyl or $(C_4-C_{10})$-halocycloalkyl,
$R^2$ represents $(C_1-C_{12})$-alkyl, $(C_1-C_{12})$-haloalkyl, $(C_6-C_{10})$-aryl, $(C_6-C_{10})$-haloaryl, $(C_7-C_{10})$-aralkyl, $(C_7-C_{10})$-haloaralkyl, $(C_4-C_{10})$-cycloalkyl or $(C_4-C_{10})$-halocycloalkyl,
$R^3$ and $R^4$ each independently of one another represent hydrogen, $(C_1-C_4)$-alkyl, phenyl or benzyl,
$R^5$ represents $(C_1-C_{12})$-alkyl, $(C_1-C_{12})$-haloalkyl, $(C_6-C_{10})$-aryl, $(C_6-C_{10})$-haloaryl, $(C_7-C_{10})$-aralkyl, $(C_7-C_{10})$-haloaralkyl, $(C_4-C_{10})$-cycloalkyl or $(C_4-C_{10})$-halocycloalkyl,
X represents oxygen or sulfur and
n is 0 or 1,
in the presence of one or more free-radical-forming substances (IV), wherein two separate mixtures (G1) and (G2) are metered into the reactor and these mixtures (G1) and (G2) have the following composition:
mixture (G1) comprises one or more compounds of formula (II) and one or more free-radical-forming substances (IV)

and
mixture (G2) comprises one or more compounds of formula (III), one or more compounds of formula (II) and optionally one or more free-radical-forming substances (IV).

DETAILED DESCRIPTION OF A PREFERRED EMBODIMENT

The process according to the invention, particularly in one of the embodiments of the process according to the invention described as preferable/particularly preferable, affords the phosphorus-containing cyanohydrin esters of formula (I)/of hereinbelow-defined formulae (Ia)/(Ib) in improved yield and regularly in higher purity.

The processes according to the invention, and also the further hereinbelow-described process according to the invention for producing glufosinate, form fewer undesired secondary components so that the processes according to the invention are more efficient and more energy-saving.

The respective alkyl radicals of the radicals $R^1$, $R^2$, $R^3$, $R^4$ and $R^5$ may have a straight-chain or branched-chain (branched) carbon skeleton.

The expression "$(C_1-C_4)$-alkyl" is a brief notation for an alkyl radical having 1 to 4 carbon atoms, i.e. encompasses the radicals methyl, ethyl, 1-propyl, 2-propyl, 1-butyl, 2-butyl, 2-methylpropyl or tert-butyl. General alkyl radicals having a larger specified range of carbon atoms, for example "$(C_1-C_6)$-alkyl", correspondingly also encompass straight-chain or branched alkyl radicals having a greater number of carbon atoms, i.e. in this example also the alkyl radicals having 5 and 6 carbon atoms.

"Halogen" preferably refers to the group consisting of fluorine, chlorine, bromine and iodine. Haloalkyl, haloaryl, haloaralkyl and halocycloalkyl respectively refer to alkyl, aryl, aralkyl and cycloalkyl partially or completely substituted by identical or different halogen atoms, preferably from the group fluorine, chlorine and bromine, in particular from the group fluorine and chlorine. Thus haloalkyl encompasses for example monohaloalkyl (=monohalogenalkyl), dihaloalkyl (=dihalogenalkyl), trihaloalkyl (=trihalogenalkyl) or else perhaloalkyl, for example $CF_3$, $CHF_2$, $CH_2F$, $CF_3CF_2$, $CH_2FCHCl$, $CCl_3$, $CHCl_2$, $CH_2CH_2Cl$. The same applies for the other halogen-substituted radicals.

Suitable and preferred compounds of formula (II) include inter alia: methanephosphonous acid mono($C_1-C_6$)-alkyl esters, monododecyl methanephosphonate, monophenyl methanephosphonate; ethanephosphonous acid mono($C_1$-$C_6$)-alkyl esters, monododecyl ethanephosphonate, monophenyl ethanephosphonate; propanephosphonous acid mono ($C_1$-$C_6$)-alkyl esters, monododecyl propanephosphonate, monophenyl propanephosphonate; butanephosphonous acid mono($C_1$-$C_6$)-alkyl esters, monododecyl butanephosphonate, monophenyl butanephosphonate; phenylphosphonous acid mono($C_1$-$C_6$)-alkyl esters, monododecyl phenylphosphonate, monophenyl phenylphosphonate; benzylphosphonous acid mono-($C_1$-$C_6$)-alkyl esters, monododecyl benzylphosphonate, monophenyl benzylphosphonate; methylthiophosphonous acid mono($C_1$-$C_6$)-alkyl esters, monododecyl methylthiophosphonate, monophenyl methylthiophosphonate; dimethylphosphine oxide, diethylphosphine oxide, dipropylphosphine oxide, dibutylphosphine oxide, diphenylphosphine oxide, methylphenylphosphine oxide, dibenzylphosphine oxide, dimethylphosphine sulphide and diphenylphosphine sulphide.

The production of the compounds of formula (II) is known to those skilled in the art and may be effected according to processes known from the literature (for example U.S. Pat. Nos. 3,914,345; 4,474,711; 4,485,052; 4,839,105; 5,128,495).

The production of the cyanohydrin esters of formula (III) is likewise known to those skilled in the art and may be effected according to processes known from the literature (for example as per EP 0 019 750 A1 and as per U.S. Pat. No. 4,521,348 and the relevant documents cited therein).

It is preferable when in the process according to the invention:

$R^3$ and $R^4$ each independently of one another represent hydrogen or methyl, and/or X represents oxygen, and/or n is 1.

The process according to the invention preferably relates to the production of phosphorus-containing cyanohydrin esters of formula (Ia)

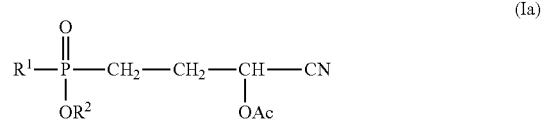

characterized in that a compound of formula (IIa)

is reacted with an acrolein cyanohydrin ester of formula (IIIa), wherein one of the compounds or the compound of formula (III) corresponds to formula (IIIa) (acrolein cyanohydrin-O-acetate, Ac=acetyl, $R^5$ in formula (I) correspondingly=methyl)

wherein in each case:

$R^1$ represents $(C_1-C_6)$-alkyl, $(C_1-C_6)$-haloalkyl, $(C_6-C_8)$-aryl, $(C_6-C_8)$-haloaryl, $(C_7-C_{10})$-aralkyl, $(C_7-C_{10})$-haloaralkyl, $(C_5-C_8)$-cycloalkyl or $(C_5-C_8)$-halocycloalkyl and $R^2$ represents $(C_1-C_6)$-alkyl, $(C_1-C_6)$-haloalkyl, $(C_6-C_8)$-aryl, $(C_6-C_8)$-haloaryl, $(C_7-C_{10})$-aralkyl, $(C_7-C_{10})$-haloaralkyl, $(C_5-C_8)$-cycloalkyl or $(C_5-C_8)$-halocycloalkyl.

It is preferable when in each case:

$R^1$ represents $(C_1-C_4)$-alkyl or $(C_1-C_4)$-haloalkyl, preferably methyl or ethyl, $R^2$ represents $(C_1-C_6)$-alkyl or $(C_1-C_6)$-haloalkyl, preferably $(C_3-C_6)$-alkyl, preference among these in turn being given to $C_4$-alkyl or $C_5$-alkyl.

In the process according to the invention in formula (I) and in formula (Ia)

$R^1$ particularly preferably represents methyl and $R^2$ particularly preferably represents $(C_1-C_6)$-alkyl, preference among these in turn being given to $(C_4-C_5)$-alkyl.

The implementations which follow and the embodiments of the process according to the invention characterized as preferable/particularly preferable apply in particular for the reaction of a compound of formula (IIa), in which $R^1$ represents methyl (and thus corresponds to the hereinbelow-defined compound of formula (IIb)) and $R^2$ represents ($C_1$-$C_6$)-alkyl, with the acrolein cyanohydrin ester of formula (IIIa).

In the process according to the invention the mixtures (G1) and (G2) defined in the context of the present invention are metered into the reactor (i.e. the reaction vessel) from separate (i.e. spatially removed) receptacles.

In the process according to the invention at least a portion of the altogether employed entirety of the free-radical-forming substances (IV) is mixed with a portion of the altogether employed entirety of the compounds of formula (II)/(IIa) before the resulting mixture (G1) is metered into the reactor.

Furthermore, in the process according to the invention at least a portion of the altogether employed entirety of the compounds of formula (II)/(IIa) is mixed with the compound(s) of formula (III)/(IIIa) and optionally in addition with one or more free-radical-forming substances (IV) before the resulting mixture (G2) is metered into the reactor.

An advantageous process according to the invention is characterized in that the mixture (G1) comprises 10-90 wt % of the entirety of the amount of compounds of formula (II) altogether employed in the mixtures (G1) and (G2).

A preferred process according to the invention is characterized in that the mixture (G1) comprises 20-80 wt % of the entirety of the amount of compounds of formula (II) altogether employed in the mixtures (G1) and (G2).

A preferred process according to the invention is characterized in that the mixture (G1) comprises 25-75 wt % of the entirety of the amount of compounds of formula (II) altogether employed in the mixtures (G1) and (G2).

A more preferred process according to the invention is characterized in that the mixture (G1) comprises 30-70 wt %, especially preferably 40-60 wt %, of the entirety of the amount of compounds of formula (II) altogether employed in the mixtures (G1) and (G2).

A particularly preferred process according to the invention is characterized in that the mixture (G1) comprises one or more compounds of formula (II) and 20-100 mol % of the entirety of the amount of the free-radical-forming substances (IV) altogether employed in the mixtures (G1) and (G2)

and the mixture (G2) comprises one or more compounds of formula (III), one or more compounds of formula (II) and 0-80 mol % of the entirety of the amount of the free-radical-forming substances (IV) altogether employed in the mixtures (G1) and (G2).

A particularly preferred process according to the invention is characterized in that the mixture (G1) comprises 25-100 mol %, by preference 30-100 mol %, preferably 40-100 mol %, more preferably 50-100 mol %, yet more preferably 60-100 mol %, especially preferably 70-100 mol % and particularly preferably 80-100 mol % of the entirety of the amount of the free-radical-forming substances (IV) altogether employed in the mixtures (G1) and (G2)

and/or the mixture (G2) comprises 0-75 mol %, by preference 0-70 mol %, preferably 0-60 mol %, more preferably 0-50 mol %, yet more preferably 0-40 mol %, especially preferably 0-30 mol % and particularly preferably 0-20 mol % of the entirety of the amount of the free-radical-forming substances (IV) altogether employed in the mixtures (G1) and (G2).

In a particularly preferred embodiment the process according to the invention is characterized in that the mixture (G1) comprises 90-100 mol %, by preference 95-100 mol %, preferably 97-100 mol %, more preferably 98-100 mol %, of the entirety of the amount of the free-radical-forming substances (IV) altogether employed in the mixtures (G1) and (G2)

and the mixture (G2) comprises 0-10 mol %, by preference 0-5 mol %, preferably 0-3 mol %, more preferably 0-2 mol %, of the entirety of the amount of the free-radical-forming substances (IV) altogether employed in the mixtures (G1) and (G2).

In a particularly more preferred embodiment the process according to the invention is characterized in that the mixture (G1) comprises 99-100 mol %, preferably 100 mol %, of the entirety of the amount of the free-radical-forming substances (IV) altogether employed in the mixtures (G1) and (G2)

and the mixture (G2) comprises 0-1 mol %, preferably 0 mol %, of the entirety of the amount of the free-radical-forming substances (IV) altogether employed in the mixtures (G1) and (G2).

A particularly preferred process according to the invention is characterized in that the entirety of the compounds (II) and (IV) in the mixture (G1) is 75 to 100 wt %, preferably 80 to 100 wt %, more preferably 85 to 100 wt %, particularly preferably 90 to 100 wt %, in each case based on the total weight of the mixture (G1).

The process according to the invention is preferably carried out under conditions in which free-radicals are formed.

The reaction of the compounds of formula (II) and (III)/of formula (IIa) and (IIIa) to afford the compounds of formula (I)/(Ia) in a process according to the invention is preferably effected with the aid of a free-radical-forming source, for example using electromagnetic fields such as UV radiation, gamma radiation or X-rays, electric fields or electrochemical methods or in the presence of one or more free-radical-forming substances.

In the context of the process according to the invention it is preferable to employ free-radical-forming substances.

A preferred process according to the invention is characterized in that one, more than one or all of the free-radical-forming substances (IV) conform to formula (V)

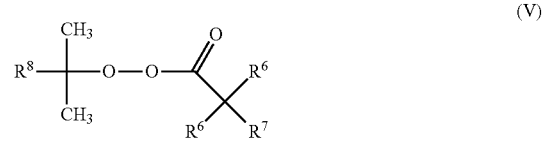

wherein $R^6$ independently at each occurrence represents hydrogen, ($C_1$-$C_{10}$)-alkyl, by preference ($C_1$-$C_6$)-alkyl, preferably ($C_1$-$C_4$)-alkyl, $R^7$ represents hydrogen, ($C_1$-$C_{10}$)-alkyl, by preference hydrogen or ($C_1$-$C_6$)-alkyl, preferably hydrogen or ($C_1$-$C_4$)-alkyl, and
R⁸ represents methyl, ethyl, 2,2-dimethylpropyl or phenyl.

Preferred free-radical-forming substances of formula (V) are those in which
R⁶ independently at each occurrence represents $(C_1$-$C_{10})$-alkyl, by preference $(C_1$-$C_6)$-alkyl, preferably $(C_1$-$C_4)$-alkyl,
R⁷ represents hydrogen or $(C_1$-$C_{10})$-alkyl, by preference hydrogen or $(C_1$-$C_6)$-alkyl, preferably hydrogen or $(C_1$-$C_4)$-alkyl,
and
R⁸ represents methyl, ethyl, 2,2-dimethylpropyl or phenyl.

The free-radical-formers (radical initiators) of formula (V) are known per se and in some cases commercially available.

The free-radical-formers of formula (V) are preferably selected from the group consisting of tert-butyl peroxypivalate, tert-amyl peroxypivalate, tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, tert-amyl peroxyneodecanoate, cumyl peroxyneodecanoate, cumyl peroxyneoheptanoate, cumyl peroxypivalate and mixtures thereof.

The free-radical-formers of formula (V) are preferably selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate.

The process according to the invention allows production of the phosphorus-containing cyanohydrin esters of formula (I) or (Ia)/of hereinbelow-defined formula (Ib) under mild reaction conditions and in a manner that is simpler to carry out in terms of process/plant engineering. The phosphorus-containing cyanohydrin esters of formula (I), (Ia) and (Ib) can therefore be obtained more easily in process engineering terms, in even better yields and in high purity.

The process according to the invention is preferably carried out such that the mixtures (G1) and (G2) are metered into the reactor predominantly simultaneously, preferably simultaneously.

The process according to the invention is preferably carried out such that the reaction is effected at a temperature in the range from 40° C. to 120° C., preferably at a temperature in the range from 50° C. to 110° C., more preferably at a temperature in the range from 55° C. to 100° C. and particularly preferably at a temperature in the range from 60° C. to 95° C.

Performing the process according to the invention thus significantly reduces or largely avoids a disproportionation of reactants of formula (II)/(IIa) for example. Performing the process according to the invention also significantly reduces or largely avoids the oligomerization and polymerization of the compounds of formula (III)/(IIIa).

It is advantageous in the context of the process according to the invention to employ the cyanohydrin esters of formula (III)/(IIIa) in the highest possible purity. It is preferable when the cyanohydrin esters of formula (III)/(IIIa) are employed in a purity of not less than 90 wt %, preferably of not less than 92 wt %, more preferably of not less than 95 wt %, especially preferably of not less than 98 wt %.

The formed phosphorus-containing cyanohydrin esters of formula (I)/(Ia)/hereinbelow-defined formula (Ib) may be used as starting materials for the synthesis of phosphorus-containing amino acids, for example glufosinate (such a synthesis route is more particularly described hereinbelow).

To avoid undesired side reactions and thus to achieve high yields it is additionally advantageous to employ the phosphorus-containing reactant (II)/(IIa) in a molar excess based on the cyanohydrin esters of formula (III)/(IIIa).

The process according to the invention in these preferred embodiments further has the advantage that no large excesses of compounds of formula (II)/(IIa) based on the employed entirety of compounds of formula (III)/(IIIa) are required to achieve the advantageous effects of the process according to the invention.

Preferably, in the process according to the invention the molar ratio of the entirety of the employed compound of formula (II)/(IIa) to the entirety of the employed compound of formula (III)/(IIIa) is in the range from 8:1 to 1:1, preferably in the range from 5:1 to 2:1.

Preferably, in the process according to the invention the molar ratio of the entirety of the employed compound of formula (II)/(IIa) to the entirety of the employed compound of formula (III)/(IIIa) is in the range from 5:1 to 5:2, more preferably in the range from 9:2 to 5:2.

Particularly preferred embodiments of the process according to the invention for producing the compounds of formula (I) by reaction of a compound of formula (II) with the acrolein cyanohydrin ester of formula (III) are characterized in that mixture (GI) comprises 10-90 wt % of the entirety of the amount of compounds of formula (II) altogether employed in the mixtures (GI) and (G2), by preference 20-80 wt %, preferably 25-75 wt %, more preferably 30-70 wt % and especially preferably 40-60 wt % in each case based on the entirety of the amount of compounds of formula (II) altogether employed in the mixtures (GI) and (G2), the molar ratio of the entirety of the employed compound of formula (II) to the entirety of the employed compound of formula (III) is in the range from 8:1 to 1:1, preferably in the range from 5:1 to 2:1
and
the reaction is effected at a temperature in the range from 40° C. to 120° C., preferably at a temperature in the range from 50° C. to 110° C., more preferably at a temperature in the range from 55° C. to 100° C. and particularly preferably at a temperature in the range from 60° C. to 95° C.

Particularly preferred embodiments of the process according to the invention for producing the compounds of formula (I) by reaction of a compound of formula (II) with the acrolein cyanohydrin ester of formula (III) are characterized in that
mixture (G1) comprises 10-90 wt % of the entirety of the amount of compounds of formula (II) altogether employed in the mixtures (G1) and (G2), by preference 20-80 wt %, preferably 25-75 wt %, more preferably 30-70 wt % and especially preferably 40-60 wt % in each case based on the entirety of the amount of compounds of formula (II) altogether employed in the mixtures (G1) and (G2),
mixture (G1) comprises one or more compounds of formula (II) and 20-100 mol % of the entirety of the amount of the free-radical-forming substances (IV) altogether employed in the mixtures (G1) and (G2),
mixture (G2) comprises one or more compounds of formula (III), one or more compounds of formula (II) and 0-80 mol % of the entirety of the amount of the free-radical-forming substances (IV) altogether employed in the mixtures (G1) and (G2),
the molar ratio of the entirety of the employed compound of formula (II) to the entirety of the employed compound of formula (III) is in the range from 8:1 to 1:1, preferably in the range from 5:1 to 2:1, wherein one, more than one or all of the free-radical-forming substances (IV) conform to formula (V) and are preferably selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is effected at a temperature in the range from 40° C. to 120° C., preferably at a temperature in the range from 50° C. to 110° C., more preferably at a temperature in the range from 55° C. to 100° C. and particularly preferably at a temperature in the range from 60° C. to 95° C.

Particularly preferred embodiments of the process according to the invention for producing the compounds of formula (I) by reaction of a compound of formula (II) with the acrolein cyanohydrin ester of formula (III), in particular for producing the compounds of formula (Ia) by reaction of a compound of formula (IIa) with the acrolein cyanohydrin ester of formula (IIIa) are characterized in that mixture (G1) comprises 10-90 wt % of the entirety of the amount of compounds of formula (II) altogether employed in the mixtures (G1) and (G2), by preference 20-80 wt %, preferably 25-75 wt %, more preferably 30-70 wt % and especially preferably 40-60 wt % in each case based on the entirety of the amount of compounds of formula (II) altogether employed in the mixtures (G1) and (G2), mixture (G1) comprises 25-100 mol %, by preference 30-100 mol %, preferably 40-100 mol %, more preferably 50-100 mol %, yet more preferably 60-100 mol %, especially preferably 70-100 mol % and particularly preferably 80-100 mol % of the entirety of the amount of the free-radical-forming substances (IV) altogether employed in the mixtures (G1) and (G2), mixture (G2) comprises 0-75 mol %, by preference 0-70 mol %, preferably 0-60 mol %, more preferably 0-50 mol %, yet more preferably 0-40 mol %, especially preferably 0-30 mol % and particularly preferably 0-20 mol % of the entirety of the amount of the free-radical-forming substances (IV) altogether employed in the mixtures (G1) and (G2), the entirety of the compounds (II) and (IV) in the mixture (G1) is 75 to 100 wt %, preferably 80 to 100 wt %, more preferably 85 to 100 wt %, particularly preferably 90 to 100 wt %, in each case based on the total weight of the mixture (G1), the molar ratio of the entirety of the employed compound of formula (II) to the entirety of the employed compound of formula (III) is in the range from 5:1 to 2:1, wherein one, more than one or all of the free-radical-forming substances (IV) conform to formula (V) and are preferably selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is effected at a temperature in the range from 50° C. to 110° C., preferably at a temperature in the range from 55° C. to 100° C. and particularly preferably at a temperature in the range from 60° C. to 95° C.

Particularly preferred embodiments of the process according to the invention for producing the compounds of formula (I) by reaction of a compound of formula (II) with the acrolein cyanohydrin ester of formula (III), in particular for producing the compounds of formula (Ia) by reaction of a compound of formula (IIa) with the acrolein cyanohydrin ester of formula (IIIa) are characterized in that mixture (G1) comprises 10-90 wt % of the entirety of the amount of compounds of formula (II) altogether employed in the mixtures (G1) and (G2), by preference 20-80 wt %, preferably 25-75 wt %, more preferably 30-70 wt % and especially preferably 40-60 wt % in each case based on the entirety of the amount of compounds of formula (II) altogether employed in the mixtures (G1) and (G2), mixture (G1) comprises 40-100 mol %, more preferably 50-100 mol %, yet more preferably 60-100 mol %, especially preferably 70-100 mol % and particularly preferably 80-100 mol % of the entirety of the amount of the free-radical-forming substances (IV) altogether employed in the mixtures (G1) and (G2), mixture (G2) comprises 0-60 mol %, more preferably 0-50 mol %, yet more preferably 0-40 mol %, especially preferably 0-30 mol % and particularly preferably 0-20 mol % of the entirety of the amount of the free-radical-forming substances (IV) altogether employed in the mixtures (G1) and (G2), the entirety of the compounds (II) and (IV) in the mixture (G1) is 80 to 100 wt %, preferably 85 to 100 wt %, particularly preferably 90 to 100 wt %, in each case based on the total weight of the mixture (G1), the molar ratio of the entirety of the employed compound of formula (II) to the entirety of the employed compound of formula (III) is in the range from 5:1 to 2:1, wherein one, more than one or all of the free-radical-forming substances (IV) conform to formula (V) and are selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is effected at a temperature in the range from 50° C. to 110° C., preferably at a temperature in the range from 55° C. to 100° C. and particularly preferably at a temperature in the range from 60° C. to 95° C.

Especially preferred embodiments of the process according to the invention for producing the compounds of formula (Ia) by reaction of a compound of formula (IIa) with the acrolein cyanohydrin ester of formula (IIIa) are characterized in that mixture (G1) comprises 20-80 wt % of the entirety of the amount of compounds of formula (II) altogether employed in the mixtures (G1) and (G2), preferably 25-75 wt %, more preferably 30-70 wt % and especially preferably 40-60 wt % in each case based on the entirety of the amount of compounds of formula (II) altogether employed in the mixtures (G1) and (G2), mixture (G1) comprises 50-100 mol %, preferably 60-100 mol %, especially preferably 70-100 mol % and particularly preferably 80-100 mol % of the entirety of the amount of the free-radical-forming substances (IV) altogether employed in the mixtures (G1) and (G2), mixture (G2) comprises 0-50 mol %, preferably 0-40 mol %, especially preferably 0-30 mol % and particularly preferably 0-20 mol % of the entirety of the amount of the free-radical-forming substances (IV) altogether employed in the mixtures (G1) and (G2), the entirety of the compounds (IIa) and (IV) in the mixture (G1) is 80 to 100 wt %, preferably 85 to 100 wt %, particularly preferably 90 to 100 wt %, in each case based on the total weight of the mixture (G1), the molar ratio of the entirety of the employed compound of formula (IIa) to the entirety of the employed compound of formula (IIIa) is in the range from 5:1 to 2:1, wherein one, more than one or all of the free-radical-forming substances (IV) conform to formula (V) and are selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is effected at a temperature in the range from 50° C. to 110° C., preferably at a temperature in the range from 55° C. to 100° C. and particularly preferably at a temperature in the range from 60° C. to 95° C.

Especially preferred embodiments of the process according to the invention for producing the compounds of formula (Ia) by reaction of a compound of formula (IIa) with the acrolein cyanohydrin ester of formula (IIIa) are characterized in that mixture (G1) comprises 20-80 wt % of the entirety of the amount of compounds of formula (II) altogether employed in the mixtures (G1) and (G2), preferably 25-75 wt %, more preferably 30-70 wt % and especially preferably 40-60 wt % in each case based on the entirety of the amount of compounds of formula (II) altogether employed in the mixtures (G1) and (G2), mixture (G1) comprises 60-100 mol %, preferably 70-100 mol % and particularly preferably 80-100 mol % of the entirety of the amount of the free-radical-forming substances (IV) altogether employed in the mixtures (G1) and (G2), mixture (G2) comprises 0-40 mol %, preferably 0-30 mol % and particularly preferably 0-20 mol % of the entirety of the amount of the free-radical-forming substances (IV) altogether employed in the mixtures (G1) and (G2), the entirety of the compounds (IIa) and (IV) in the mixture (G1) is 80 to 100 wt %, preferably 85 to 100 wt %, particularly preferably 90 to 100 wt %, in each case based on the total weight of the mixture (G1), the molar ratio of the entirety of the employed compound of formula (IIa) to the entirety of the employed compound of formula (IIIa) is in the range from 5:1 to 5:2, wherein one, more than one or all of the free-radical-forming substances (IV) conform to formula (V) and are selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is effected at a temperature in the range from 50° C. to 110° C., preferably at a temperature in the range from 55° C. to 100° C. and particularly preferably at a temperature in the range from 60° C. to 95° C.

Especially preferred embodiments of the process according to the invention for producing the compounds of formula (Ia) by reaction of a compound of formula (IIa), in which preferably $R^1$ represents methyl (and thus corresponds to the hereinbelow-defined compound of formula (IIb)) and $R^2$ represents $(C_1-C_6)$-alkyl, with the acrolein cyanohydrin ester of formula (IIIa) are characterized in that mixture (G1) comprises 25-75 wt % of the entirety of the amount of compounds of formula (II) altogether employed in the mixtures (G1) and (G2), preferably 30-70 wt % and especially preferably 40-60 wt % in each case based on the entirety of the amount of compounds of formula (II) altogether employed in the mixtures (G1) and (G2), mixture (G1) comprises 80-100 mol % of the entirety of the amount of the free-radical-forming substances (IV) altogether employed in the mixtures (G1) and (G2), mixture (G2) comprises 0-20 mol % of the entirety of the amount of the free-radical-forming substances (IV) altogether employed in the mixtures (G1) and (G2), the entirety of the compounds (IIa) and (IV) in the mixture (G1) is 85 to 100 wt %, preferably 90 to 100 wt %, in each case based on the total weight of the mixture (G1), the molar ratio of the entirety of the employed compound of formula (IIa) to the entirety of the employed compound of formula (IIIa) is in the range from 5:1 to 5:2, preferably in the range from 9:2 to 5:2, wherein one, more than one or all of the free-radical-forming substances (IV) conform to formula (V) and are selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is carried out at a temperature in the range from 55° C. to 100° C., particularly preferably at a temperature in the range from 60° C. to 95° C.

Especially preferred embodiments of the process according to the invention for producing the compounds of formula (Ia) by reaction of a compound of formula (IIa), in which preferably $R^1$ represents methyl (and thus corresponds to the hereinbelow-defined compound of formula (IIb)) and $R^2$ represents $(C_1-C_6)$-alkyl, with the acrolein cyanohydrin ester of formula (IIIa) are characterized in that mixture (G1) comprises 25-75 wt % of the entirety of the amount of compounds of formula (II) altogether employed in the mixtures (G1) and (G2), preferably 30-70 wt % and especially preferably 40-60 wt % in each case based on the entirety of the amount of compounds of formula (II) altogether employed in the mixtures (G1) and (G2), mixture (G1) comprises 90-100 mol %, by preference 95-100 mol %, preferably 97-100 mol %, more preferably 98-100 mol %, of the entirety of the amount of the free-radical-forming substances (IV) altogether employed in the mixtures (G1) and (G2), mixture (G2) comprises 0-10 mol %, by preference 0-5 mol %, preferably 0-3 mol %, more preferably 0-2 mol %, of the entirety of the amount of the free-radical-forming substances (IV) altogether employed in the mixtures (G1) and (G2), the entirety of the compounds (IIa) and (IV) in the mixture (G1) is 85 to 100 wt %, preferably 90 to 100 wt %, in each case based on the total weight of the mixture (G1), the molar ratio of the entirety of the employed compound of formula (IIa) to the entirety of the employed compound of formula (IIIa) is in the range from 5:1 to 5:2, preferably in the range from 9:2 to 5:2, wherein one, more than one or all of the free-radical-forming substances (IV) conform to formula (V) and are selected from the group consisting of tert-butyl peroxyneodecanoate, 1,1,3,3-tetramethylbutyl peroxyneodecanoate, tert-butyl peroxy-2-ethylhexanoate, 1,1,3,3-tetramethylbutyl peroxy-2-ethylhexanoate, cumyl peroxyneodecanoate and mixtures thereof, particular preference in turn being given to 1,1,3,3-tetramethylbutyl peroxyneodecanoate, tert-butyl peroxyneodecanoate and/or tert-butyl peroxy-2-ethylhexanoate and the reaction is carried out at a temperature in the range from 55° C. to 100° C., particularly preferably at a temperature in the range from 60° C. to 95° C.

Especially preferred embodiments of the process according to the invention for producing the compounds of formula (Ia) by reaction of a compound of formula (IIa), in which preferably $R^1$ represents methyl (and thus corresponds to the hereinbelow-defined compound of formula (IIb)) and $R^2$ represents $(C_1-C_6)$-alkyl, with the acrolein cyanohydrin ester of formula (IIIa) are characterized in that mixture (G1) comprises 25-75 wt % of the entirety of the amount of compounds of formula (II) altogether employed in the mixtures (G1) and (G2), preferably 30-70 wt % and especially preferably 40-60 wt % in each case based on the entirety of the amount of compounds of formula (II) altogether employed in the mixtures (G1) and (G2), mixture (G1) comprises 95-100 mol %, preferably 97-100 mol %, more preferably 98-100 mol % of the entirety of the amount of the free-radical-forming substances (IV) altogether employed in the mixtures (G1) and (G2), mixture (G2) comprises 0-5 mol %, preferably 0-3 mol %, more preferably 0-2 mol % of the entirety of the amount of the free-radical-forming substances (IV) altogether employed in the mixtures (G1) and (G2), the entirety of the compounds (IIa) and (IV) in the mixture (G1) is 85 to 100 wt %, preferably 90 to 100 wt %, in each case based on the total weight of the mixture (G1), the molar ratio of the entirety of the employed compound of formula (IIa) to the entirety of the employed compound of formula (IIIa) is in the range from 9:2 to 5:2, wherein all of the free-radical-forming substances (IV) correspond to formula (V) and are selected from the group consisting of 1,1,3,3-tetramethylbutyl peroxyneodecanoate, tert-butyl peroxyneodecanoate tert-butyl peroxy-2-ethylhexanoate and mixtures thereof and the reaction is carried out at a temperature in the range from 55° C. to 100° C., particularly preferably at a temperature in the range from 60° C. to 95° C.

Especially preferred embodiments of the process according to the invention for producing the compounds of formula (Ia) by reaction of a compound of formula (IIa), in which preferably $R^1$ represents methyl (and thus corresponds to the hereinbelow-defined compound of formula (IIb)) and $R^2$ represents $(C_1-C_6)$-alkyl, with the acrolein cyanohydrin ester of formula (IIIa) are characterized in that mixture (G1) comprises 25-75 wt % of the entirety of the amount of compounds of formula (II) altogether employed in the mixtures (G1) and (G2), preferably 30-70 wt % and especially preferably 40-60 wt % in each case based on the entirety of the amount of compounds of formula (II) altogether employed in the mixtures (G1) and (G2), mixture (G1) comprises 99-100 mol %, preferably 100 mol %, of the entirety of the amount of the free-radical-forming substances (IV) altogether employed in the mixtures (G1) and (G2), mixture (G2) comprises 0-1 mol %, preferably 0 mol %, of the entirety of the amount of the free-radical-forming substances (IV) altogether employed in the mixtures (G1) and (G2), the entirety of the compounds (IIa) and (IV) in the mixture (G1) is 90 to 100 wt % based on the total weight of the mixture (G1), the molar ratio of the entirety of the employed compound of formula (IIa) to the entirety of the employed compound of formula (IIIa) is in the range from 9:2 to 5:2, wherein all of the free-radical-forming substances (IV) correspond to formula (V) and are selected from the group consisting of 1,1,3,3-tetramethylbutyl peroxyneodecanoate, tert-butyl peroxyneodecanoate tert-butyl peroxy-2-ethylhexanoate and mixtures thereof and the reaction is effected at a temperature in the range from 60° C. to 95° C.

The process according to the invention may be carried out either in a discontinuous process regime (for example in a semibatch mode of operation) or else in a continuous process regime (for example in a continuously operated stirred tank).

In the context of the present invention a continuous process regime is to be understood as meaning that compounds (i.e. reactants such as compounds of formula (II) and (III)) are brought into the reactor (feeding/influx) while at the same time, but spatially removed therefrom, compounds (i.e. products such as compounds of formula (I)) are brought out of the reactor (discharging/efflux).

In a discontinuous process regime by contrast, the steps of feeding of reactants (i.e. of reactants such as compounds of formula (II) and (III)), reaction (i.e. reaction of the reactants) and discharging of the products (i.e. products such as compounds of formula (I)) from the reactor are effected consecutively or overlapping only in individual stages.

The process according to the invention is preferably carried out such that the metering of the mixtures (G1) and (G2) into the reactor is effected substantially continuously, preferably continuously.

Such a substantially continuous or preferably continuous process regime is economically advantageous since, for example, unproductive reactor times due to filling and emptying processes and lengthened reaction times due to safety engineering reasons, reactor-specific heat exchange performances and heating and cooling processes such as are encountered in semibatch processes and batch processes can be avoided/minimized.

The process according to the invention is preferably carried out under inertization, preferably in a protective gas atmosphere. Preferred protective gases are nitrogen/argon.

It is further possible to carry out the process according to the invention under superatmospheric pressure or under reduced pressure.

The process according to the invention may be carried out in an optional diluent.

Usable optional diluents in principle include various organic solvents, preferably toluene, xylenes, chlorobenzene, dichlorobenzenes, dimethyl formamide (DMF), dimethylacetamide, N-methyl-2-pyrrolidone (NMP) or mixtures of these organic solvents. The process according to the invention is preferably carried out without such further optional solvents.

However, it may be advantageous to carry out the process according to the invention in previously formed reaction product of formula (I), (Ia) or (Ib) as diluent.

In the case of a continuous mode of operation in particular it is advantageous to carry out the process according to the invention in previously formed reaction product of formula (I), (Ia) or (Ib) or in a mixture of reaction product of formula (I), (Ia) or (Ib) and reactant of formula (II)/(IIa) as diluent.

The purity of the desired products of formula (I) after purification, for example after distillative removal of an excess of the component (II)/(IIa), is regularly greater than 95%. A preferably recovered excess of the starting compound (II)/(IIa) may subsequently be reemployed in the same reaction without further purification.

This applies in particular for the compound of formula (Ib) where $R^2$=n-butyl which is obtained by the process according to the invention by reaction of the phosphorus-containing reactant (IIa) where $R^1$=methyl and $R^2$=n-butyl with acrolein cyanohydrin-O-acetate of formula (IIIa).

Glufosinate salts in the context of the present invention are preferably ammonium salts, phosphonium salts, sulfonium salts, alkali metal salts and alkaline earth metal salts of glufosinate.

Especially preferred in the context of the present invention are glufosinate, glufosinate sodium and glufosinate ammonium.

In a further aspect the present invention relates to the production of glufosinate

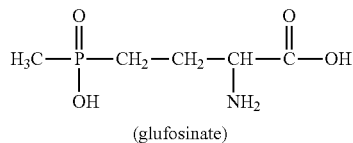
(glufosinate)

or glufosinate salts (preferably glufosinate ammonium) characterized in that in this process a compound of formula (Ib) is employed

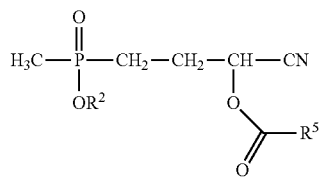
(Ib)

wherein $R^2$ has the meaning defined in accordance with the invention hereinabove, preferably the meaning defined as preferable hereinabove and particularly preferably the meaning defined as particularly preferable hereinabove and $R^5$ has the meaning recited hereinabove and preferably represents methyl and the production of a compound of formula (Ib) is effected by a process defined in accordance with the invention.

In a preferred aspect the present invention relates to the production of glufosinate and/or glufosinate salts

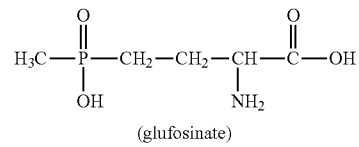
(glufosinate)

characterized by reaction of a compound of formula (Ib) by the step of:
reaction of a compound of formula (IIb)

(IIb)

wherein
$R^2$ represents $(C_1-C_6)$-alkyl, preferably $(C_4-C_5)$-alkyl and particularly preferably n-butyl or n-pentyl, with acrolein cyanohydrin-O-acetate of formula (IIIa)

(IIIa)

wherein the reaction of (IIb) with (IIIa) is effected by the hereinabove-described process according to the invention, preferably in one of the embodiments described as preferable and particularly preferably in one of the embodiments described as particularly preferable.

The process according to the invention for producing glufosinate and/or glufosinate salts is further preferably effected by reaction of a compound of formula (Ib) with $NH_3$ to afford compound (VI),

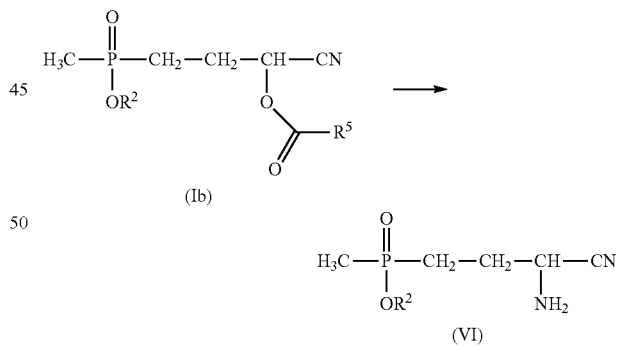
(VI)

wherein $R^2$ and $R^5$ each have the meaning recited hereinabove, and subsequent hydrolysis of compound (VI) to afford glufosinate/the salts thereof.

The process according to the invention for producing glufosinate and/or glufosinate salts may be effected in similar fashion as described for example in U.S. Pat. No. 4,521,348.

Finally, the present invention also relates to the use of a compound of formula (I)/(Ib) as defined hereinabove and produced by a process according to the invention for producing glufosinate/glufosinate salts, in particular glufosinate, glufosinate sodium or glufosinate ammonium.

The present invention further relates to a process for producing glufosinate/glufosinate salts, in particular glufosinate, glufosinate sodium or glufosinate ammonium, comprising the following steps (a) and (b):

(a) producing of a compound of formula (I)/(Ib) as defined hereinabove, (b) use of the compound of formula (I)/(Ib) obtained in step (a) for producing glufosinate/glufosinate salts, in particular glufosinate, glufosinate sodium or glufosinate ammonium.

The examples which follow elucidate the present invention:

EXAMPLES

All data are based on weight unless otherwise stated.
Abbreviations used:
MPE: methanephosphonous acid mono-n-butyl ester
ACA: acrolein cyanohydrin acetate
ACM: n-butyl (3-cyano-3-acetoxypropyl)methylphosphinate

Example 1: n-butyl (3-cyano-3-acetoxypropyl)methylphosphinate (ACM)

Equipment: 500 ml jacketed stirred vessel fitted with a thermometer, impeller stirrer and bottom outlet valve connected to a heatable stirred vessel; two HPLC pumps.
Initiator Reaction:

A 500 ml jacketed stirred vessel fitted with a thermometer, impeller stirrer (400 rpm) and closed bottom outlet valve under inertization with nitrogen was initially charged with 150 g of MPE (98% purity) and heated to an internal temperature of 85° C. with stirring. 0.9 g of t-butyl peroxyneodecanoate (98% purity, free-radical initiator) were added thereto and 47.9 g of a mixture of 52 g of ACA (98% purity) and 2.7 g of t-butyl peroxyneodecanoate (98% purity, free-radical initiator) were subsequently metered into the reactor (i.e. jacketed stirred vessel) at a constant rate over 2 h via an HPLC pump. The resulting reaction mixture was clear and pale-yellow.
Continuous Metering:

The reaction temperature was held at 85° C. At the same stirrer speed the following mixtures (G1) and (G2) were simultaneously and uniformly metered into the jacketed stirred vessel via two separate HPLC pumps over a duration of 10 hours:

Pump 1 metered mixture (G1) composed of 400 g of MPE and 9.6 g of t-butyl peroxyneodecanoate (98% purity) and pump 2 metered mixture (G2) composed of 182 g of ACA and 200 g of MPE.

Simultaneously, a total of 780 g of the resulting reaction mixture were continuously discharged into the lower stirred vessel via the bottom outlet valve so that the fill-level in the upper jacketed stirred vessel remained constant. In the lower stirred vessel the discharged reaction mixture was subjected to further stirring at 80° C. to 85° C.

Upon termination of the reaction analysis revealed that the combined total reaction mixture no longer comprised any ACA. GC analysis indicated that the combined total reaction mixture obtained comprised 47.1% MPE and 46.3% ACM. This corresponds to a yield of 447.4 g of ACM (=1.71 mol) corresponding to 95.1% of theory based on the amount of ACA employed.

Example 2: n-butyl (3-cyano-3-acetoxypropyl)methylphosphinate (ACM)

Equipment: 500 ml jacketed stirred vessel fitted with a thermometer, impeller stirrer and bottom outlet valve connected to a heatable stirred vessel; two HPLC pumps.

GC and NMR samples were taken and analysed after every substep.
Initiator Reaction:

A 500 ml jacketed stirred vessel fitted with a thermometer, impeller stirrer (400 rpm) and closed bottom outlet valve under inertization with nitrogen was initially charged with 50 g (0.36 mol) of MPE (98% purity) and heated to an internal temperature of 85° C. with stirring. 0.8 g (0.0033 mol) of the free-radical initiator t-butyl peroxyneodecanoate (98%) were then added and the simultaneous metering of the following mixtures (G1) and (G2) was immediately commenced:

(G1)=a mixture of 50.0 g (0.36 mol) of MPE (98% purity) and 2.18 g (0.0089 mol) of the free-radical initiator t-butyl peroxyneodecanoate (98% purity) from balance 1 via pump 1 and (G2)=a mixture of 40.5 g (0.32 mol) of ACA (99% purity) and 50.0 g (0.36 mol) of MPE (98% purity) from balance 2 via pump 2.

Holding the internal temperature constant at 85° C., these two mixtures (G1) and (G2) were metered into the reactor over 2.5 hours. At the end of the metering the reaction mixture was almost colourless and clear and ACA was no longer detectable (GC, NMR).
Continuous Metering:

The internal temperature continued to be held at 85° C. Subsequently, the following mixtures (G1) and (G2) were likewise simultaneously metered into the reactor over 2.5 hours:

(G1)=a mixture of 50.0 g (0.36 mol) of MPE (98% purity) and 2.18 g (0.0089 mol) of the free-radical initiator t-butyl peroxyneodecanoate (98% purity) from balance 1 via pump 1 and (G2)=a mixture of 40.5 g (0.32 mol) of ACA (99% purity) and 50.0 g (0.36 mol) of MPE (98% purity) from balance 2 via pump 2.

The resulting reaction mixture was meanwhile uniformly discharged into the lower stirred vessel via the bottom outlet valve so that the fill-level in the upper jacketed stirred vessel remained constant. In the lower stirred vessel the discharged reaction mixture was subjected to further stirring at 80° C. At the end of the metering time the reaction mixture obtained was pale-yellow and clear and ACA was no longer detectable (GC, NMR).

The process described in this continuous metering was subsequently repeated a further 3 times under identical conditions.

Upon termination of the reaction analysis revealed that the combined total reaction mixture no longer comprised any ACA. The combined total reaction mixture was pale-yellow and clear. GC analysis indicated that the combined total reaction mixture obtained comprised 48.1% MPE and 43.5% ACM. This corresponds to a yield of 1.55 mol of the desired product ACM, corresponding to at least 96.5% of theory based on the amount of ACA employed.

The separation of MPE and ACM was effected via a short-path, thin-film distillation under vacuum.

Example 3: n-butyl (3-cyano-3-acetoxypropyl)methylphosphinate (ACM)

The materials, conditions and equipment described in example 1 were employed unless otherwise stated.

Similarly to example 1, in the initiator reaction 24 g of MPE were initially charged, inertized with nitrogen and heated to 76° C. After addition of 0.1 g of the free-radical initiator 1,1,3,3-tetramethylbutyl peroxyneodecanoate, the following mixtures (G1) and (G2) were simultaneously and uniformly metered from two syringe pumps into the reactor over 2 hours at constant temperature with vigorous stirring: a mixture (G1) of 18.0 g of MPE and 1.2 g of the free radical initiator 1,1,3,3-tetramethylbutyl peroxyneodecanoate and a mixture (G2) of 11.5 g of ACA and 8.0 g of MPE.

Continuous Metering:

As described hereinabove in the initial part, a mixture (G1) of 36 g of MPE and 2.4 g of the free radical initiator 1,1,3,3-tetramethylbutyl peroxyneodecanoate and a mixture (G2) of 23 g of ACA and 16 g of MPE were then simultaneously and uniformly metered into the reactor over four hours via the two pumps. An additional 48 g of MPE were simultaneously metered in via a dropping funnel.

In order to maintain a constant fill-level in the reactor, over the entire metering duration, 122 g of reaction mixture were discharged via the bottom valve into a stirred receiver held at 76° C. After a postreaction time of 15 minutes the reaction mixtures obtained were combined. The resulting reaction mixture was pale-yellow and clear. To work up the mixture the low-boiling components were distilled off via a short path evaporator.

A total of 74.3 g of crude product having an ACM content of 90.8% (GC analysis) were obtained. This corresponds to a yield of 94.8% of theory based on the amount of ACA employed. The crude product remaining in the bottoms was employed directly for further reactions, for example for producing glufosinate ammonium.

Comparative Example 1: n-butyl (3-cyano-3-acetoxypropyl)methylphosphinate (ACM)

The materials, conditions and equipment described in example 1 were employed unless otherwise stated.

Under nitrogen, 97.7 g of MPE (98% purity, 0.703 mol) were initially charged and heated to 85° C. After addition of a drop of the free-radical initiator t-butyl peroxyneodecanoate, a mixture of 23.6 g of ACA (98% purity, 0.1848 mol) and 1.2 g of t-butyl peroxyneodecanoate (0.005 mol) were then metered into the reactor at a constant rate over 4 hours via a syringe pump with vigorous stirring at the same temperature. After a postreaction time of 15 min the mixture was cooled to 20° C.

GC analysis revealed the reaction mixture obtained to comprise 36.1% of the desired product ACM, corresponding to 91.6% of theory.

The invention claimed is:

1. A process for producing a compound of formula (I)

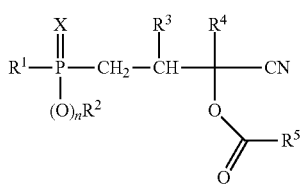

wherein a compound of formula (II)

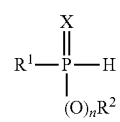

is reacted with a compound of formula (III)

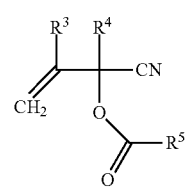

wherein in each case:
R$^1$ represents (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl,
R$^2$ represents (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl,
R$^3$ and R$^4$ each independently of one another represent hydrogen, (C$_1$-C$_4$)-alkyl, phenyl or benzyl,
R$^5$ represents (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl,
X represents oxygen or sulfur and
n is 0 or 1,
in the presence of one or more free-radical-forming substances (IV),
wherein at least one of the free-radical-forming substances (IV) is a compound of formula (V)

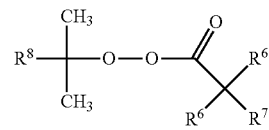

wherein
R$^6$ independently at each occurrence represents hydrogen or (C$_1$-C$_{10}$)-alkyl
R$^7$ represents hydrogen or (C$_1$-C$_{10}$)-alkyl, and
R$^8$ represents methyl, ethyl, 2,2-dimethylpropyl or phenyl,
wherein two separate mixtures (G1) and (G2) are metered into the reactor and these mixtures (G1) and (G2) have the following composition:
mixture (G1) comprises one or more compounds of formula (II) and one or more free-radical-forming substances (IV)
and
mixture (G2) comprises one or more compounds of formula (III), one or more compounds of formula (II) and optionally one or more free-radical-forming substances (IV), and wherein mixture (G1) comprises 25-75 wt % of the entirety of the amount of compounds of formula (II) altogether employed in the mixtures (G1) and (G2).

2. The process according to claim 1, wherein mixture (G1) comprises one or more compounds of formula (II) and 20-100 mol % of the entirety of the amount of the free-radical-forming substances (IV) altogether employed in the mixtures (G1) and (G2), and mixture (G2) comprises one or more compounds of formula (III), one or more compounds of formula (II) and 0-80 mol % of the entirety of the amount of the free-radical-forming substances (IV) altogether employed in the mixtures (G1) and (G2).

3. The process according to claim 1, wherein mixture (G1) comprises 25-100 mol of the entirety of the amount of the free-radical-forming substances (IV) altogether employed in the mixtures (G1) and (G2), and/or mixture (G2) comprises 0-75 mol %, of the entirety of the amount of the free-radical-forming substances (IV) altogether employed in the mixtures (G1) and (G2).

4. The process according to claim 1, wherein the entirety of the compounds (II) and (IV) in the mixture (G1) is 75 to 100 wt in each case based on the total weight of the mixture (G1).

5. The process according to claim 1, wherein the mixtures (G1) and (G2) are metered into the reactor predominantly simultaneously or simultaneously.

6. The process according to claim 1, wherein the metering of the mixtures (G1) and (G2) into the reactor is carried out substantially continuously or continuously.

7. The process according to claim 1, wherein more than one or all of the free-radical-forming substances (IV) are compounds of formula (V)

wherein $R^6$ independently at each occurrence represents hydrogen or $(C_1-C_6)$-alkyl, $R^7$ represents hydrogen or $(C_1-C_6)$-alkyl, and $R^8$ represents methyl, ethyl, 2,2-dimethylpropyl or phenyl.

8. The process according to claim 1, wherein the reaction is carried out at a temperature in the range from 40° C. to 120° C.

9. The process according to claim 1, wherein the molar ratio of the entirety of the employed compound of formula (II) to the entirety of the employed compound of formula (III) is in the range from 8:1 to 1:1.

10. The process according to claim 1, wherein one of the compounds or the compound of formula (II) is a compound of formula (IIa)

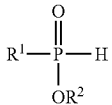

(IIa)

wherein $R^1$ represents $(C_1-C_6)$-alkyl, $(C_1-C_6)$-haloalkyl, $(C_6-C_8)$-aryl, $(C_6-C_8)$-haloaryl, $(C_7-C_{10})$-aralkyl, $(C_7-C_{10})$-haloaralkyl, $(C_5-C_8)$-cycloalkyl or $(C_5-C_8)$-halocycloalkyl and $R^2$ represents $(C_1-C_6)$-alkyl, $(C_1-C_6)$-haloalkyl, $(C_6-C_8)$-aryl, $(C_6-C_8)$-haloaryl, $(C_7-C_{10})$-aralkyl, $(C_7-C_{10})$-haloaralkyl, $(C_5-C_8)$-cycloalkyl or $(C_5-C_8)$-halocycloalkyl, and one of the compounds or the compound of formula (III) is a compound of formula (IIIa)

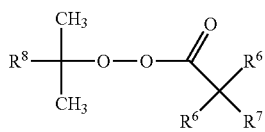

(IIIa)

11. The process according to claim 1, wherein mixture (G1) comprises 80-100 mol % of the entirety of the amount of the free-radical-forming substances (IV) altogether employed in the mixtures (G1) and (G2), and mixture (G2) comprises 0-20 mol % of the entirety of the amount of the free-radical-forming substances (IV) altogether employed in the mixtures (G1) and (G2).

12. The process according to claim 1, wherein the entirety of the compounds (II) and (IV) in the mixture (G1) is 90 to 100 wt % in each case based on the total weight of the mixture (G1).

13. The process according to claim 1, wherein $R^6$ independently at each occurrence represents hydrogen or $(C_1-C_4)$-alkyl.

14. The process according to claim 1, wherein $R^7$ represents hydrogen or $(C_1-C_4)$-alkyl.

15. The process according to claim 1, wherein $R^6$ independently at each occurrence represents hydrogen or $(C_1-C_4)$-alkyl; and $R^7$ represents hydrogen or $(C_1-C_4)$-alkyl.

16. The process according to claim 1, wherein the molar ratio of the entirety of the employed compound of formula (II) to the entirety of the employed compound of formula (III) is in the range from 5:1 to 2:1.

17. The process according to claim 1, wherein the reaction is carried out at a temperature in the range from 60° C. to 95° C.

18. A process for producing glufosinate

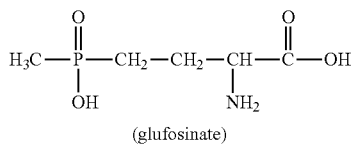

(glufosinate)

or one or more glufosinate salts, comprising
(a) obtaining a compound of formula (Ib)

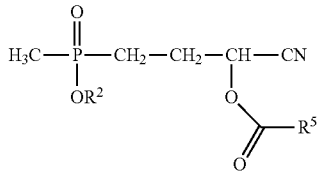
(Ib)

by reacting a compound of formula (II)

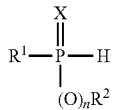
(II)

with a compound of formula (III)

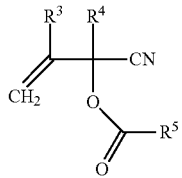
(III)

wherein in each case:
$R^1$ represents ($C_1$-$C_{12}$)-alkyl, ($C_1$-$C_{12}$)-haloalkyl, ($C_6$-$C_{10}$)-aryl, ($C_6$-$C_{10}$)-haloaryl, ($C_7$-$C_{10}$)-aralkyl, ($C_7$-$C_{10}$)-haloaralkyl, ($C_4$-$C_{10}$)-cycloalkyl or ($C_4$-$C_{10}$)-halocycloalkyl,
$R^2$ represents ($C_1$-$C_{12}$)-alkyl, ($C_1$-$C_{12}$)-haloalkyl, ($C_6$-$C_{10}$)-aryl, ($C_6$-$C_{10}$)-haloaryl, ($C_7$-$C_{10}$)-aralkyl, ($C_7$-$C_{10}$)-haloaralkyl, ($C_4$-$C_{10}$)-cycloalkyl or ($C_4$-$C_{10}$)-halocycloalkyl,
$R^3$ and $R^4$ each independently of one another represent hydrogen, ($C_1$-$C_4$)-alkyl, phenyl or benzyl,
$R^5$ represents ($C_1$-$C_{12}$)-alkyl, ($C_1$-$C_{12}$)-haloalkyl, ($C_6$-$C_{10}$)-aryl, ($C_6$-$C_{10}$)-haloaryl, ($C_7$-$C_{10}$)-aralkyl, ($C_7$-$C_{10}$)-haloaralkyl, ($C_4$-$C_{10}$)-cycloalkyl or ($C_4$-$C_{10}$)-halocycloalkyl,
X represents oxygen or sulfur and
n is 0 or 1,
in the presence of one or more free-radical-forming substances (IV),
wherein at least one of the free-radical-forming substances (IV) is a compound of formula (V)

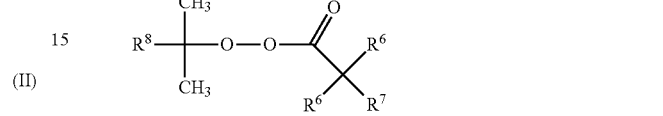
(V)

wherein
$R^6$ independently at each occurrence represents hydrogen or ($C_1$-$C_{10}$)-alkyl, $R^7$ represents hydrogen or ($C_1$-$C_{10}$)-alkyl,
and
$R^8$ represents methyl, ethyl, 2,2-dimethylpropyl or phenyl,
wherein two separate mixtures (G1) and (G2) are metered into the reactor and these mixtures (G1) and (G2) have the following composition:
mixture (G1) comprises one or more compounds of formula (II) and one or more free-radical-forming substances (IV)
and
mixture (G2) comprises one or more compounds of formula (III), one or more compounds of formula (II) and optionally one or more free-radical-forming substances (IV), and
wherein mixture (G1) comprises 25-75 wt % of the entirety of the amount of compounds of formula (II) altogether employed in the mixtures (G1) and (G2); and
(b) reacting said compound of formula (Ib) with $NH_3$.
19. The process according to claim 18, wherein $R^5$ is methyl.

* * * * *